United States Patent [19]
Kunishi

[11] Patent Number: 6,004,041
[45] Date of Patent: Dec. 21, 1999

[54] OPTICAL FIBER CONNECTOR

[75] Inventor: Shinsuke Kunishi, Hadano, Japan

[73] Assignee: Molex Incorporated, Lisle, Ill.

[21] Appl. No.: 08/977,177

[22] Filed: Nov. 24, 1997

[30] Foreign Application Priority Data

Dec. 6, 1996 [JP] Japan .................................. 8-342458

[51] Int. Cl.[6] .................................................. G02B 6/36
[52] U.S. Cl. ................................. 385/59; 385/87; 385/81
[58] Field of Search ................................ 385/69, 86, 87, 385/59, 136, 137, 81

[56] References Cited

U.S. PATENT DOCUMENTS

| | | | |
|---|---|---|---|
| 4,171,857 | 10/1979 | Forberg et al. | 339/97 P |
| 4,812,006 | 3/1989 | Osborn et al. | 350/96.21 |
| 4,813,880 | 3/1989 | Kramer et al. | 439/65 |
| 5,033,974 | 7/1991 | Biederstedt et al. | 439/265 |
| 5,033,981 | 7/1991 | Scholtholt et al. | 439/716 |
| 5,044,979 | 9/1991 | Siemon et al. | 439/404 |
| 5,160,273 | 11/1992 | Carney | 439/108 |
| 5,163,855 | 11/1992 | Gerke et al. | 439/709 |
| 5,205,762 | 4/1993 | Carney | 439/607 |
| 5,394,497 | 2/1995 | Erdman et al. | 385/78 |
| 5,694,508 | 12/1997 | May et al. | 385/81 |

FOREIGN PATENT DOCUMENTS

| | | | |
|---|---|---|---|
| 0431805 | 6/1991 | European Pat. Off. | G02B 6/26 |
| 2164761 | 3/1986 | United Kingdom | G02B 6/38 |
| 2277206 | 10/1994 | United Kingdom | H01R 13/58 |

*Primary Examiner*—Hung N. Ngo
*Attorney, Agent, or Firm*—A. A. Tirva

[57] ABSTRACT

An improved optical fiber connector utilizes a cylindrical tube press-fit in a longitudinal opening of the connector housing for retaining a cable in the connector housing. The cylindrical tube has engagement projections formed on its outer circumference and guiding surfaces and detent projections formed on its inner circumference. The detent projections are adapted to cut into the outer sheath of the optical fiber when the optical fiber and the tube are inserted into the longitudinal opening of the connector housing for holding the optical fiber within the housing. The longitudinal opening traverses lateral opening extending between the top and bottom surfaces of the connector housing at such location that the projections of the cylindrical tube engage the lateral holes when the cylindrical tube is inserted into the longitudinal opening, locking the tube in the connector housing.

6 Claims, 5 Drawing Sheets

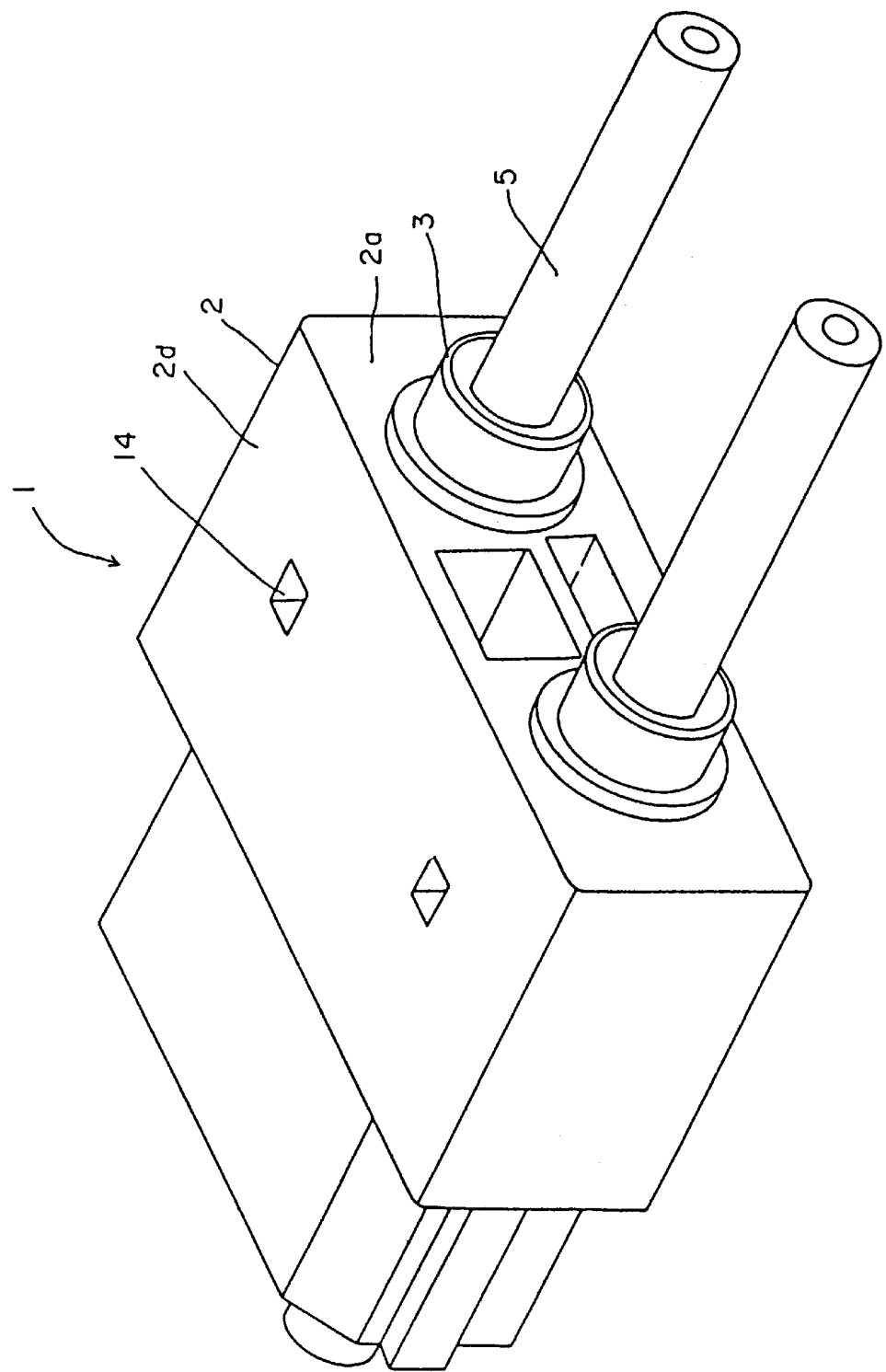

6,004,041

OPTICAL FIBER CONNECTOR

FIELD OF THE INVENTION

The present invention relates to an optical fiber connector, and more particularly to an improved structural arrangement for mounting an optical fiber in the housing of an optical fiber connector.

BACKGROUND OF THE INVENTION

A conventional optical fiber connector requires a retainer to engage an optical fiber after it is inserted into a longitudinal opening of the connector housing, thereby terminating and holding the end of the optical fiber in the connector housing.

The cable terminating work requires application of the retainer to the optical fiber after the cable is inserted into the longitudinal opening of the connector housing. Therefore, the cable terminating work inconveniently requires more than one step.

SUMMARY OF THE INVENTION

An object of the invention is to provide an optical fiber connector which allows termination of an optical fiber in a connector housing in a single step action.

To attain this object an optical fiber connector according to the present invention utilizes a cylindrical tube to be press-fit in the longitudinal opening of the connector housing.

Specifically, an optical fiber connector includes a housing having means to engage at least one optical fiber end. The housing has at least one longitudinal opening for inserting the optical fiber and according to the present invention it further includes a cylindrical tube to be pressfit in the longitudinal opening of the housing. The cylindrical tube has projections formed on its outer circumference to engage the housing and guiding surfaces and detent projections formed on its inner surface allowing the detent projections to cut into the sheath of the optical fiber when it is inserted in the longitudinal opening of the connector housing for positively holding the end of the optical fiber. Additionally, the longitudinal opening traverses lateral opening extending between the top and bottom surfaces of the connector housing at such location that the projections on the cylindrical tube are engaged by the lateral openings when the cylindrical tube is inserted into the longitudinal opening.

The cylindrical tube may have a plurality of longitudinal slots dividing its circumference into corresponding plurality of longitudinal segments.

The engagement projections and the detent projections may be located at different longitudinal positions on the cylindrical tube.

The cylindrical tube may have a first clearance close to its open end allowing the engagement projections of the cylindrical tube to resiliently move inward in response to depression of the cylindrical tube.

The surrounding wall of the longitudinal opening may have second clearance defined between the cylindrical tube and the inner wall of the longitudinal opening allowing the detents of the cylindrical tube to resiliently move outward in response to expansion of the cylindrical tube caused by pushing the optical fiber toward the front or mating side of the connector housing.

The improved retaining structure of the optical fiber connector allows the engagement of an optical fiber, after it is inserted into the longitudinal opening of the connector housing simply by press-fitting the cylindrical tube at the inlet of the longitudinal opening of the connector housing around the optical fiber cable. Otherwise, the cylindrical tube may be attached to an optical fiber at a predetermined location and then the assembly is inserted in the longitudinal opening of the connector housing until the collar of the cylindrical tube abuts the connector housing.

BRIEF DESCRIPTION OF THE DRAWINGS

Other objects and advantages of the present invention will be understood from the following description of an optical fiber connector according to a preferred embodiment of the present invention, which is shown in the accompanying drawings:

FIG. 5 is a perspective view of the optical fiber connector as seen from the bottom and rear side of the connector housing.

DETAILED DESCRIPTION OF PREFERRED EMBODIMENTS

Figure 1:
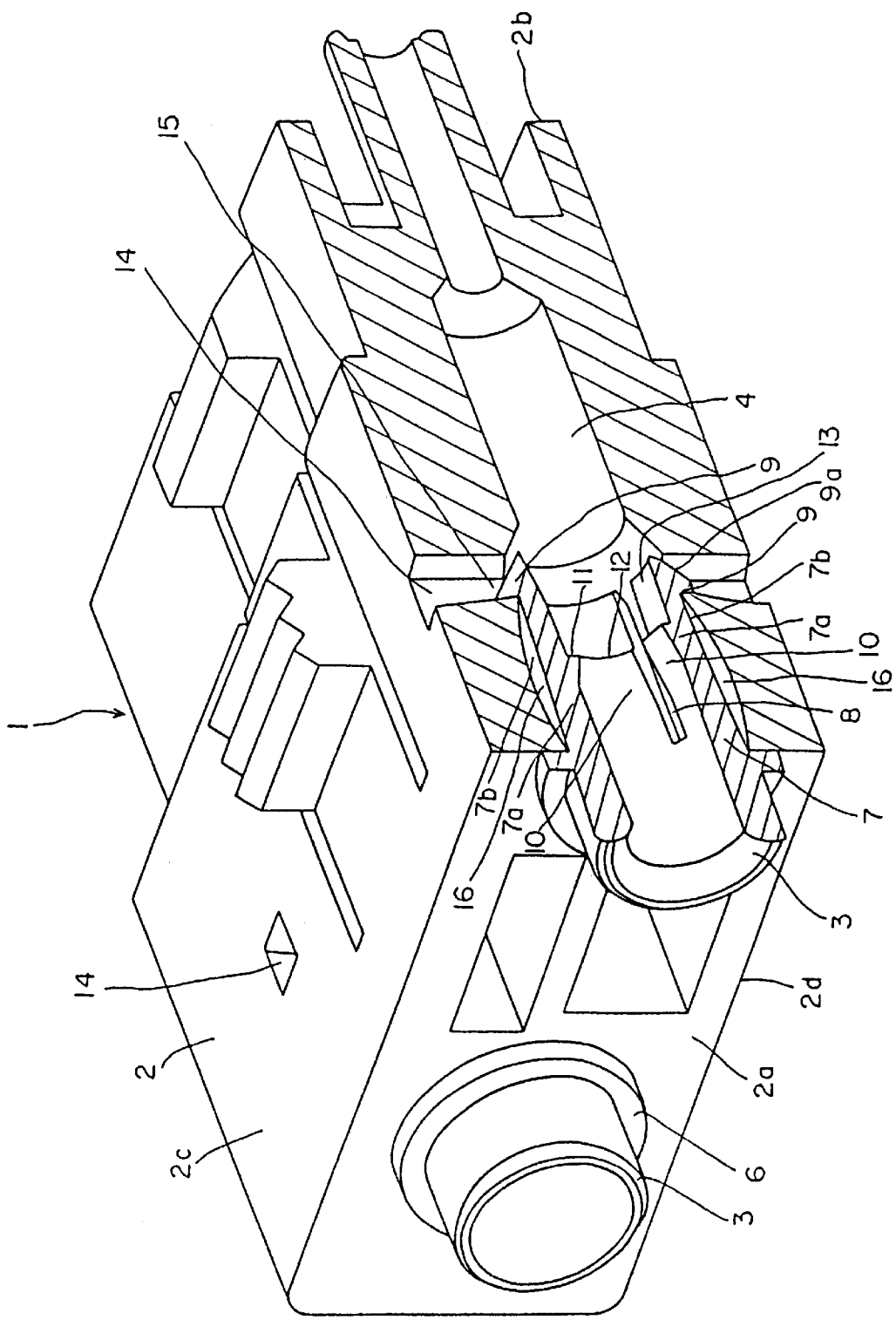
FIG. 1 is a partly sectioned, perspective view of the optical fiber connector having two cylindrical tubes press-fit in the respective longitudinal holes of the connector housing, without optical fibers being inserted therein.
Figure 2:
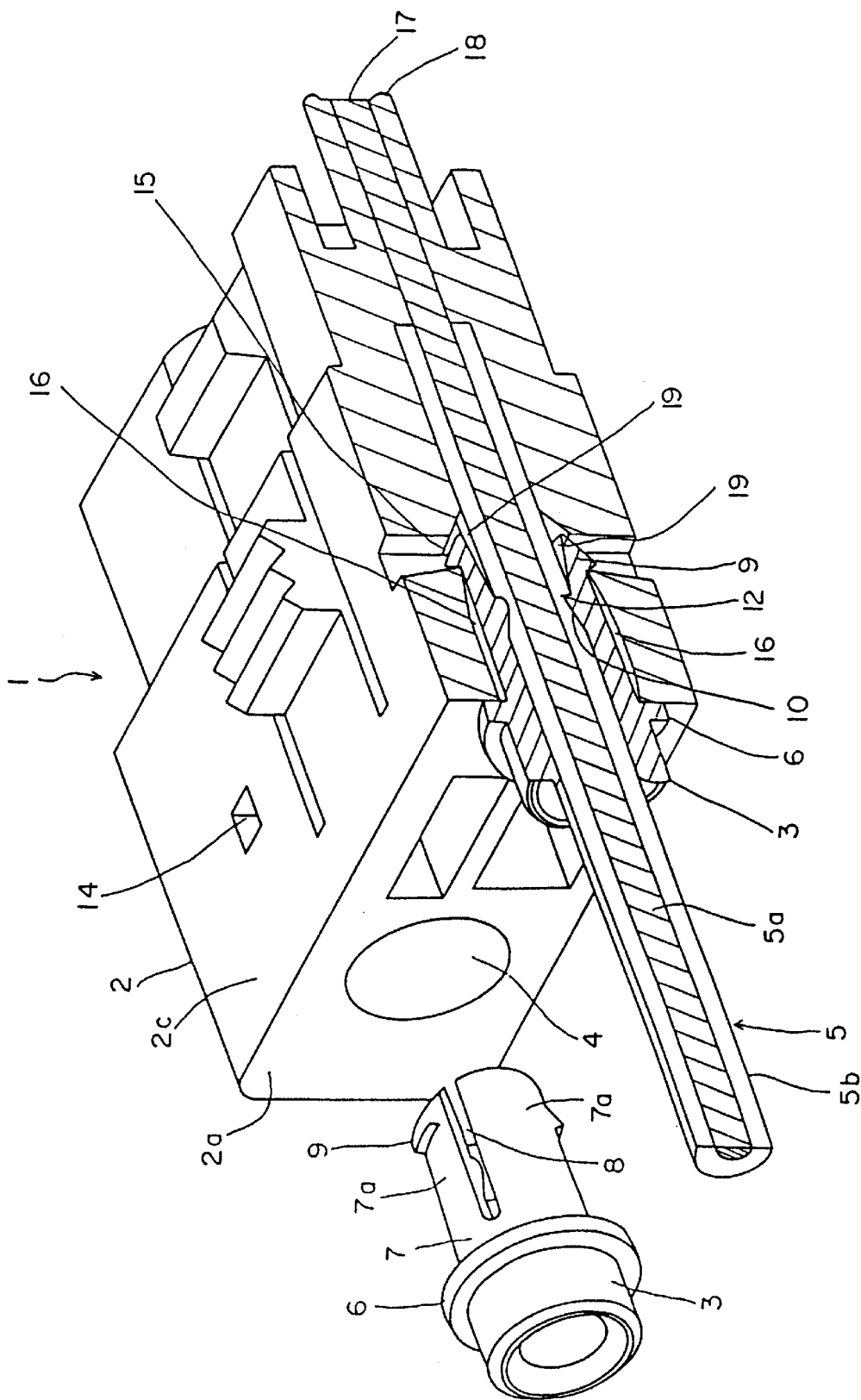
FIG. 2 is a similar perspective view, but showing one optical fiber inserted in one longitudinal opening, and one cylindrical tube to be press-fit into the other longitudinal opening.
Figure 3:
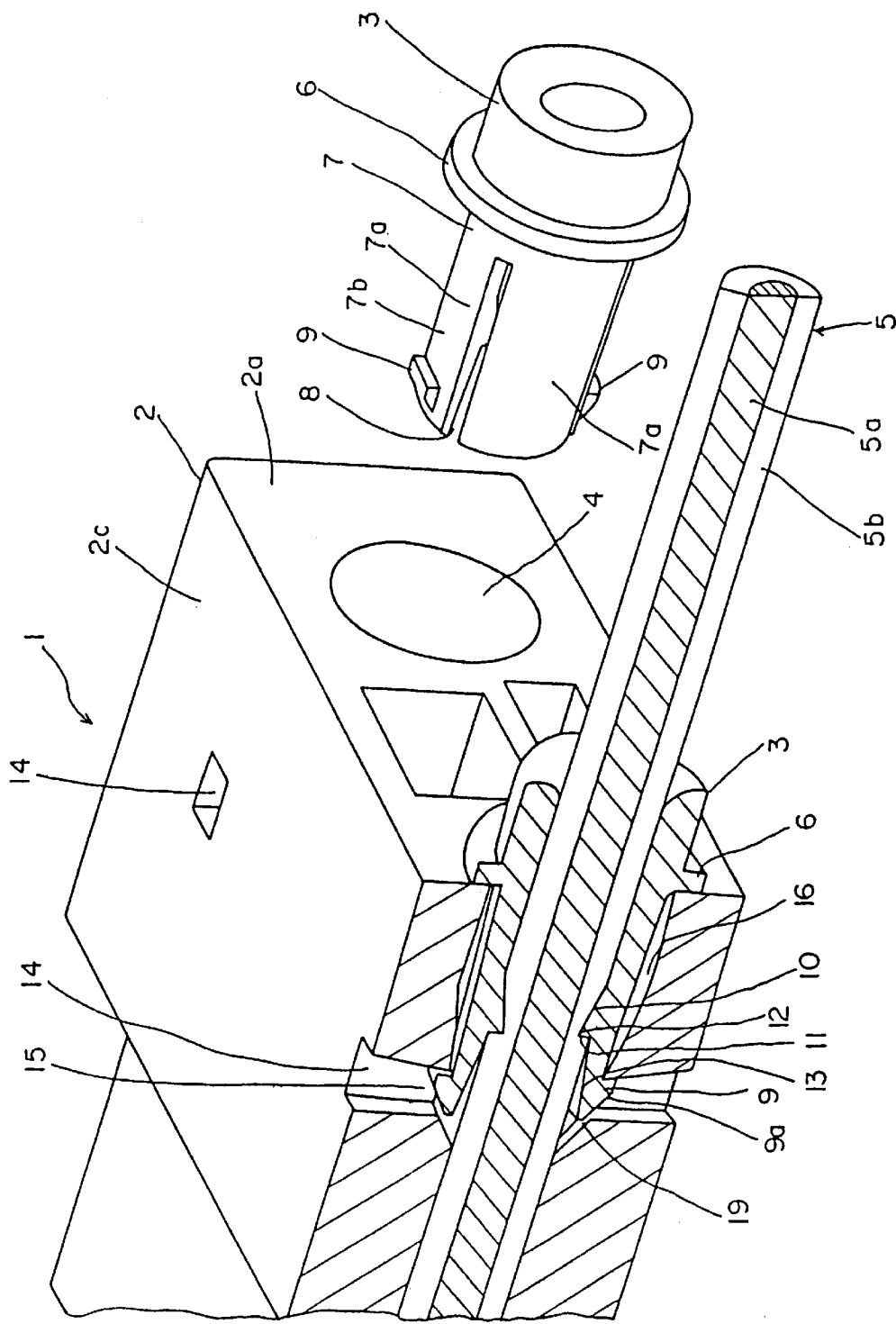
FIG. 3 is a similar perspective view of the optical fiber connector as seen from the bottom side of the connector housing.
Figure 4:
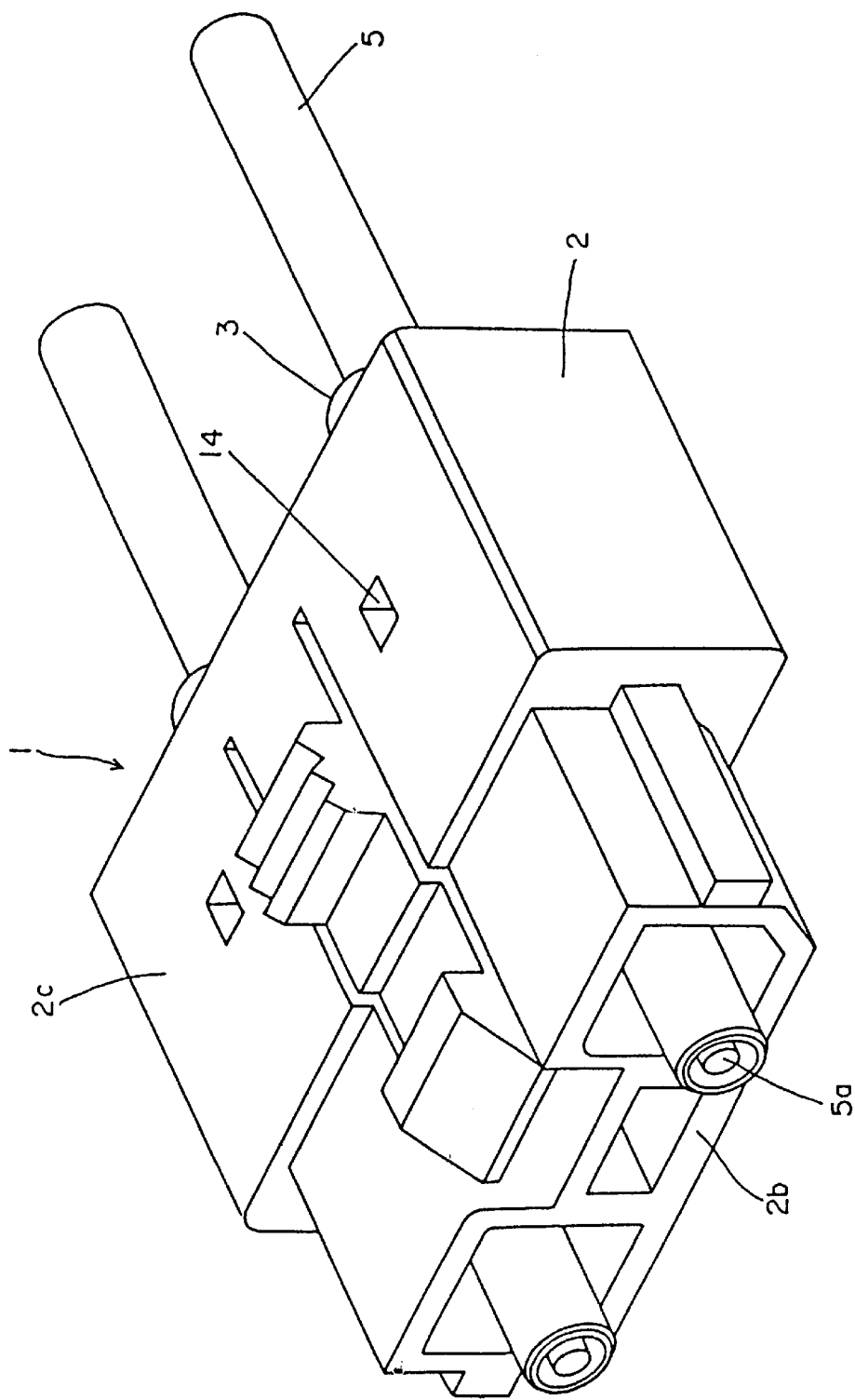
FIG. 4 is a perspective view of the optical fiber connector as seen from the top and front side of the connector housing.

An optical fiber connector 1 as shown in the drawing is a plug type connector adapted to be mated with a receptacle type connector (not shown). Connector 1 has a housing 2 which includes two cylindrical tubes 3. The housing and the tubes are made of an insulating plastic material, but may be made of an electrically conductive material. The housing 2 has two longitudinal openings 4 extending therethrough. These openings 4 extend from the rear side 2a of the housing 2 to the front, mating side 2b. The cylindrical tubes 3 may be press-fit in the openings 4 from the rear side 2a of the housing 2. Each opening 4 is circular in cross-section, and has a first length with the inner diameter equal to the outer diameter of the core 5a of an optical fiber 5 in the front section of the housing 2, and a second length with the inner diameter equal to the outer diameter of the optical fiber 5 in the intermediate section of the housing 2, and a third length with the inner diameter equal to the outer diameter of the cylindrical tube 3 in the rear section of the housing 2.

Each cylindrical tube 3 has an annular collar 6 formed thereon. Adapted to abut the rear end 2a of the housing 2 when the tube 3 is press-fit into the opening 4. Additionally, each tube has four longitudinal slots 8 dividing its circumference 7 into four segments 7a. The diametrically opposite segments 7a have engagement projections 9 formed thereon close to their free ends. Each segment 7a has a guiding surface 10 and detent projection 12 formed on its inner circumference 7c, and it has another guiding surface 13 adjacent to the guiding surface 10 and separated from it via a shoulder 11. The guiding surfaces 10 of all segments 7a together define a converging surface as viewed from the rear side 2a of the housing 2, and the guiding surfaces 13 together define a diverging surface as viewed from the rear side 2a of the housing 2. The engagement projections 9 are located near the free ends of the cylindrical tube 3, and the detent projections 12 are located sufficiently far therefrom such that the resilient movement of each segment 7a around its detent and engagement projection occurs independently from each other.

The longitudinal opening 4 traverses laterally through opening 14 extending from the top surface 2c to the bottom surface 2d of the connector housing 2 in such a location that the engagement projections 9 of the cylindrical tube 3 are engaged by the lower edges 15 of the lateral through openings 14 when the cylindrical tube 3 is inserted into the longitudinal opening 4.

The surrounding wall 4a of the longitudinal opening section extending a distance equal to the distance between collar 6 to engagement projection 9 of the cylindrical tube 3 is expanded diametrically to provide a clearance 16 defined by the outer circumference 7b of the cylindrical tube 3 and the surrounding inner wall 4a of the longitudinal opening 4, thereby allowing the detents 11 of the cylindrical tube 3 to resiliently move outward in response to expansion of the cylindrical tube 3, which expansion is caused by the pushing of the optical fiber 5 toward the front or mating side 2b of the connector housing 2, as will be later described.

Additionally, the cylindrical tube 3 has a clearance 19 close to its free ends, thereby allowing the engagement projections 9 of the cylindrical tube 3 to resiliently move inward in response to compression of the cylindrical tube 3, as will be later described.

Following is the description of the way the optical fiber connector is used. There are two different ways for terminating an optical fiber cable 5 within the connector 1. First, a predetermined length of sheath 5b is removed from the end of the optical fiber cable 5 to expose its core 5a, specifically the length being equal to the front section of the longitudinal opening 4. Then, the cylindrical tube 3 is then attached to the optical fiber cable 5 by inserting the stripped end of the optical fiber cable 5 into the cylindrical tube 3, allowing the guiding surfaces 10 and projection 12 of the cylindrical tube 3 to resiliently expand allowing the optical fiber cable 5 to pass through the cylindrical tube 3. When the cylindrical tube 3 located at a predetermined location on the cable 5, the detent projections 12 are allowed to return to their original positions by cutting into the sheath 5b of the optical fiber cable 5. More specifically, the cylindrical tube 3 is positioned on the optical fiber cable 5 at such a predetermined position that the stripped end surface 17 of the optical fiber cable 5 is flush with the end 18 of the longitudinal opening 4 when the cylindrical tube 3 surrounding the optical fiber cable 5 is inserted into the opening 4 until the collar 6 of tube 3 abuts the rear side 2a of the connector housing 2.

The optical fiber cable 5 and cylindrical tube 3 assembly is inserted into the longitudinal opening 4 from the rear side 2a of the connector housing 2. Insertion of the cylindrical tube 3 in the longitudinal opening 4 causes the oblique fronts 9a of the opposing segments 7a to engage the surrounding inner wall 4a of the longitudinal opening 4 forcing the segments 7a to converge. Converging is permitted by the clearance 19 defined between the optical fiber cable 5 and the guiding surface 13 of the cylindrical tube. When the cylindrical tube 3 is advanced such that its engagement projections 9 are engaged by the edges 15 of the lateral openings 14, the segments 7a are allowed to return to their stress-free, original positions completing the required cable termination. In the terminating position the cylindrical tube 3 is held with its projections 9 engaged by the edges 15 of the lateral opening 14, and at the same time, the detents 12 of the cylindrical tube 3 cut into the sheath 5b of the optical fiber cable 5 preventing the optical fiber cable 5 from slipping from the connector housing 2.

As an alternative, the cylindrical tube 3 is placed in the longitudinal opening 4 from the rear side 2a of the connector housing 2, and then, the stripped end of the optical fiber cable 5 is inserted into the opening 4 through the cylindrical tube 3. When the cylindrical tube 3 is located in the opening 4, the cylindrical tube 3 opening is diametrically reduced as its opposing segments 7a are pushed inward by the engagement projections 9. Since there is no cable present in the opening the converged end of the cylindrical tube 3 is permitted to enter the longitudinal opening 4 without resistance. When the collar 6 of the tubes abuts the housing 2 at the inlet of the longitudinal opening 4, the opposing segments 7a are allowed to return their original, stress-free position with their projections 9 engaged by the edges 15 of the lateral opening 14. Thereafter, the stripped end of the optical fiber cable 5 is inserted into the cylindrical tube 3 located in the longitudinal opening 4. When the unstripped length of optical fiber cable 5 comes close to the detents 12 of the cylindrical tube 3, the segments 7a of the cylindrical tube 3 are moved outward by the interaction between the sheath 5b of the optical fiber cable 5 and the guiding surfaces 10 of the cylindrical tube 3 allowing the unstripped length of optical fiber cable 5 to pass by the detents 12. The resilient movement of segments 7a is allowed by clearance 16, which exists between the cylindrical tube 3 and the surrounding inner wall 4a of the longitudinal opening 4. When the front end surface 17 of the core 5a of the optical fiber cable 5 is flush with the end 18 of the opening 4, insertion of the optical fiber cable 5 is stopped allowing the segments 7a of the cylindrical tube 3 to return to their initial positions whereby the detents 12 cut into the sheath 5b of the optical fiber cable 5. In the terminating position, the cylindrical tube 3 is held in the housing having its projections 9 engage the edges 15 of the lateral opening 14. At the same time, the detents 12 of the cylindrical tube 3 cut into the sheath 5b of the optical fiber cable 5 preventing the optical fiber cable 5 from being pulled out from the tube 3 and the connector housing 2.

As may be understood from the above, either cable-terminating way requires only insertion of the optical fiber cable into the cylindrical tube before or after the tube is inserted into the longitudinal opening for the optical fiber cable to be positively held within the connector.

The optical fiber cable 5 may be removed from the connector housing 2 by inserting rod-like tools (not shown) into the lateral opening 14 to push the engagement projections 9 inward to unlatch the cylindrical tube 3 from the connector housing 2 allowing the optical fiber cable 5 along with the unlatched cylindrical tube 3 to be pulled from the longitudinal opening 4.

The present invention is described above as being applied to a plug type of connector, however it may be applied to a receptacle type connector. The plug type connector described above is designed to mate with a receptacle type connector. However, its mating end may be shaped to be coupled with light-emitting elements or other optical devices.

I claim:

1. An optical fiber connector including a housing having means for retaining at least one end of an optical fiber covered with an outer sheath, the housing having at least one longitudinal opening extending therethrough for inserting the optical fiber, wherein the improvement comprises a cylindrical tube with an opening adapted to accommodate the cable, the tube being adapted to be removably mounted in the longitudinal opening, the cylindrical tube having projections formed on its outer circumference and guiding surfaces and detent projections formed on its inner circumference, the housing further including a lateral opening extending between the top and bottom surfaces of the housing traversing the longitudinal opening in the housing, the opening located such that when the cylindrical tube is inserted into the longitudinal opening engagement projections engage the lateral opening locking the cylindrical tube in the housing and wherein the guiding surfaces and detent projections expand allowing cable to pass through the tube and wherein the detent projections cut into the outer sheath of the optical fiber when the cable is in its final position.

2. An optical fiber connector according to claim 1 wherein the cylindrical tube has a plurality of longitudinal slots dividing its circumference into a corresponding plurality of longitudinal segments.

3. An optical fiber connector according to claim 1 wherein the projections and the detent projections are in different longitudinal positions on the cylindrical tube.

4. An optical fiber connector according to claim 1 wherein the cylindrical tube has a first clearance defined by the outer diameter of optical fiber and guiding surface of the tube close to its free end allowing the engagement projections of the cylindrical tube to resiliently move inward in response to compression of the cylindrical tube.

5. An optical fiber connector according to claim 1 wherein the surrounding inner wall of the longitudinal opening has a second clearance defined by the cylindrical tube and the inner wall of the longitudinal opening, allowing the detent projections of the cylindrical tube to resiliently move outward in response to expansion of the cylindrical tube, which expansion is caused by the movement of the optical fiber toward the front side of the connector housing.

6. An optical fiber connector according to claim 4, wherein the lateral opening provides access to the engagement projections on the outer surface of the tube enabling disengagement of the projections from the opening and removal of the tube and the optical fiber from the connector housing.

* * * * *